H. A. KNOX.
UNIVERSAL JOINT.
APPLICATION FILED MAR. 21, 1916.
1,190,425.
Patented July 11, 1916.
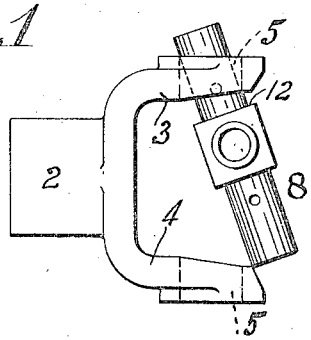
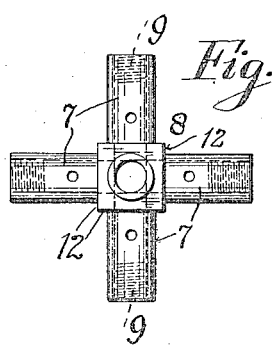
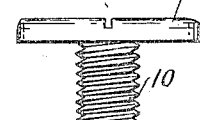
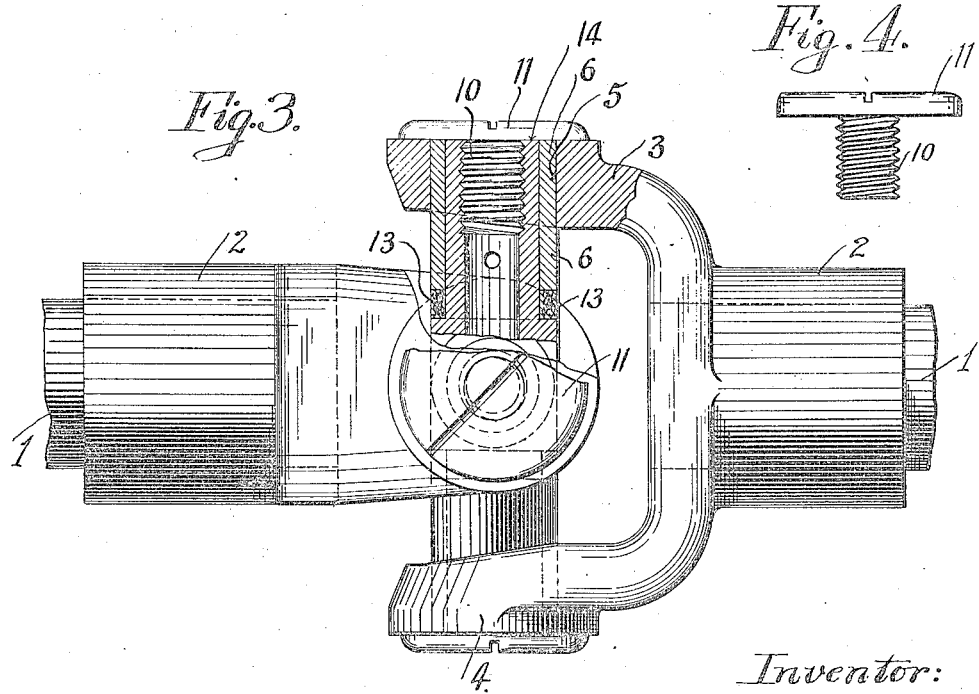
Inventor:
Harry A. Knox.
By Harry W. Bowen
his Attorney.

UNITED STATES PATENT OFFICE.

HARRY A. KNOX, OF CHICOPEE FALLS, MASSACHUSETTS.

UNIVERSAL JOINT.

1,190,425.  Specification of Letters Patent.  Patented July 11, 1916.

Application filed March 21, 1916. Serial No. 85,587.

*To all whom it may concern:*

Be it known that I, HARRY A. KNOX, a citizen of the United States of America, residing at Chicopee Falls, in the county of Hampden and State of Massachusetts, have invented certain new and useful Improvements in Universal Joints, of which the following is a specification.

This invention relates to an improvement in universal joints, and has for its object the provision of means for securely retaining the cross or coupling member in the arms of the two fork members.

Heretofore, in this class of inventions difficulty has been experienced in properly securing the cross-shaped member in the arms of the forks, particularly in case there is a threaded connection between said cross-shaped member and the hole in the arms of the forks. Such a construction, after the joint has been in use for a short time, begins to work loose resulting in a pounding or knocking noise caused by the enlargement of the hole, and after a short time the joint is rendered practically useless. My present invention, in general, therefore, comprises means for attaching the ends of the cross-shaped member to the arms of the fork, without any danger of the attachment working loose and producing a pounding or noisy action.

Broadly considered, the invention comprises a pair of fork members formed with smooth holes finished in the ends of the arms, and finished surfaces on the outer side of the arms of the forks, and sleeves or bushings located in the holes of the arms. Screw plugs are employed which engage threaded holes in the ends of the cross-shaped member, these plugs being formed with an enlarged head or flange to engage the outer finished faces of the forks as a bearing surface and having a running fit thereon.

Referring to the drawings: Figure 1 is a side elevational view showing one of the fork members and the manner in which the cross shaped member is inserted from the inside of the fork, through the openings therein; Fig. 2 is a side elevational view of the cross-shaped member detached from the forks, and illustrating the threaded openings in the ends of the same to receive the screw plugs; Fig. 3 is a view showing the parts assembled with a portion of the cross-shaped member and one arm of a fork broken away, and also clearly illustrating the screw plug and bushing in place, and Fig. 4 is a detail view of the screw plug removed from the end of the cross-shaped member.

Referring to the drawings in detail: 1 designates the ends of two coupling shafts. Attached to the ends of these shafts are fork-shaped members 2 which are provided with arms 3 and 4 arranged in the same plane. Each of the arms has formed in the outer ends thereof holes 5. These holes are formed with a round smooth finished surface to receive the bushings 6 which engage the finished bearing surface of the four arms 7 of the cross-shaped member 8, shown in Fig. 2. The cross-shaped member 8 is formed with threaded openings 9 in the ends of the arms 7 to receive the screw plugs 10, which plugs are formed with an enlarged head or flange 11. The cross-shaped member 8 is preferably formed with openings extending therethrough for the purpose of making them light, and, at the same time provide space for holding a lubricant, if desired. Interposed between the lower ends of the bushings 6 and the shoulders 12 of the cross shaped member 8 are felt rings 13.

The arms of the cross-shaped member 8 are readily inserted in the holes 5 of the arms 3 and 4, as clearly shown in Fig. 1. After the cross-shaped member 8 is inserted the bushings 6 are slipped onto the finished arms of the cross-shaped member and through the holes 5, as shown in section in Fig. 3. The screw plugs 10 are then threaded into the threaded openings 9 of the arms of the cross-shaped member 8, the head or flange 11 of the plugs 10 is screwed down firmly onto the slightly projecting ends 14 of the arms 7, but leaving a very small clearance space between the heads or flanges 11 and the finished outer faces of the ends of the arms 3 and 4. The bearing surface is between the arms 7 and the bushings 6.

It should be particularly observed that the arms 7 of the cross-shaped member 8 are finished with a long bearing surface between the shoulders 12 and their outer ends. The bushings 6 which engage these finished surfaces are of such form that they can be very easily machined and carefully finished with very little expense.

It will, therefore, be seen that my invention is one that can be constructed very cheaply and readily as there are no complicated or difficult operations to perform, and can be readily assembled and taken apart for cleaning and adjustment purposes. It should also be understood that the present invention is one that provides large bearing surfaces between the heads or flanges of the screw plugs and the outer surfaces of the arms of the fork members. The screw plugs only take the end thrusts and none of the torque or driving stresses.

The above construction is one that does not have any threaded connection between the arms of the forks and the arms 7 of the cross-shaped member 8 for the reason that the threaded construction is objectionable on account of its liability to loosen and enlarge the holes in the forks with prolonged use.

What I claim is:

1. A universal joint comprising in combination, two fork-shaped members having arms, the said arms being provided with holes having smooth finished surfaces, and finished surfaces on the outer faces of the arms, a cross-shaped member having arms which project respectively into said holes, and means, as described, for securing the said cross-shaped member in said holes, said means comprising a bushing located in said holes and engaging the arms of the cross-shaped member, and screw plugs threaded into the openings in the ends of the cross-shaped member and having flanged heads for engaging the finished surfaces on the outer faces of the arms of the said forks, said flanged heads being firmly screwed against the ends of the cross-shaped member.

2. A universal joint, comprising, two fork members having arms, and formed with smooth holes in the arms, a cross-shaped member having threaded openings in its ends, screw plugs in the threaded openings, the plugs having flanged heads firmly engaging the ends of the arms of the cross-shaped member, and slidably engaging the outer faces of the arms of the forks, and bushings located in the holes in the arms of the forks and on the arms of the cross-shaped member.

3. A coupling device comprising in combination, two fork members having holes in their arms, a cross-shaped member having its four arms integral with its hub, open ended bushings located on the arms of the cross-shaped member and in said holes, and flanged plugs firmly secured to the arms of the cross-shaped member for retaining said member in place in said fork members.

HARRY A. KNOX.